United States Patent
Audley

(10) Patent No.: US 10,355,691 B2
(45) Date of Patent: Jul. 16, 2019

(54) MINIMIZING INFORMATION LEAKAGE FROM COMBINATORIAL LOGIC

(71) Applicant: THE ATHENA GROUP, INC., Gainesville, FL (US)

(72) Inventor: Stuart Audley, Gainesville, FL (US)

(73) Assignee: THE ATHENA GROUP, INC., Gainesville, FL (US)

( * ) Notice: Subject to any disclaimer, the term of this patent is extended or adjusted under 35 U.S.C. 154(b) by 0 days.

(21) Appl. No.: 15/981,462

(22) Filed: May 16, 2018

(65) Prior Publication Data

US 2018/0269874 A1 Sep. 20, 2018

Related U.S. Application Data

(63) Continuation of application No. 15/184,386, filed on Jun. 16, 2016, now Pat. No. 9,985,632.

(60) Provisional application No. 62/180,470, filed on Jun. 16, 2015.

(51) Int. Cl.
*H03K 19/00* (2006.01)
*G06F 21/75* (2013.01)
*H03K 19/003* (2006.01)
*H03K 19/177* (2006.01)

(52) U.S. Cl.
CPC .......... *H03K 19/003* (2013.01); *G06F 21/75* (2013.01); *G06F 21/755* (2017.08); *H03K 19/17768* (2013.01)

(58) Field of Classification Search
CPC H03K 19/003; H03K 19/1776; G06F 21/558; G06F 21/75
USPC .......................................................... 326/9
See application file for complete search history.

(56) References Cited

U.S. PATENT DOCUMENTS

| | | |
|---|---|---|
| 5,751,162 A | 5/1998 | Mehendale et al. |
| 5,781,033 A | 7/1998 | Galbraith et al. |
| 6,327,661 B1 | 12/2001 | Kocher et al. |
| 2012/0169373 A1* | 7/2012 | Langadi ............ G06F 1/08 326/93 |

* cited by examiner

*Primary Examiner* — Daniel D Chang
(74) *Attorney, Agent, or Firm* — Saliwanchik, Lloyd & Eisenschenk

(57) ABSTRACT

An apparatus, system and method are disclosed to block and replace intermediate combinatorial transitions that are correlated with secret data, also referred to as glitches, with random intermediate combinatorial transitions that are uncorrelated with the data being processed.

15 Claims, 13 Drawing Sheets

MINIMIZING INFORMATION LEAKAGE FROM COMBINATORIAL LOGIC

CROSS-REFERENCE TO RELATED APPLICATIONS

This application is a U.S. Continuation Application of U.S. Ser. No. 15/184,386, filed Jun. 16, 2016, which claims the benefit of and priority to U.S. Provisional Patent Application Ser. No. 62/180,470, filed Jun. 16, 2015, which is incorporated herein by this reference in its entirety.

TECHNICAL FIELD

Embodiments of this invention relate generally to integrated circuits (ICs), and, more particularly, to a system for processing and/or storing sensitive data that may, should or must be kept secret.

BACKGROUND OF THE INVENTION

ICs take a multitude forms, including digital memory chips, microprocessors, application specific integrated circuits (ASICs), application specific standard products (ASSPs), field-programmable gate arrays (FPGAs), hardware security modules (HSMs), and more. There are many systems containing ICs in which it is important to protect the electronically stored and/or processed data, including, but not limited to, computer access control, military weapons systems, medical information, vehicle control, secure communications, and payment transaction processing. The security for the data these systems process often relies on cryptographic operations based on secret keys stored in memory or other circuitry, which are then used to cryptographically secure sensitive data from unauthorized access.

Information leaked from cryptographic circuits via side channels, such as electromagnetic emanations or power consumption variations during the aforementioned cryptographic processes, can be analyzed to determine the secret keys or sensitive data being processed. Masking keys and data can reduce leakage somewhat, but a significant amount of this side channel information leakage may still occur, such as due to transients in the combinatorial logic cloud which are correlated with the data being processed.

BRIEF DESCRIPTION OF DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

The detailed description makes reference to the accompanying figures in which.

DETAILED DESCRIPTION

Figure 1A:
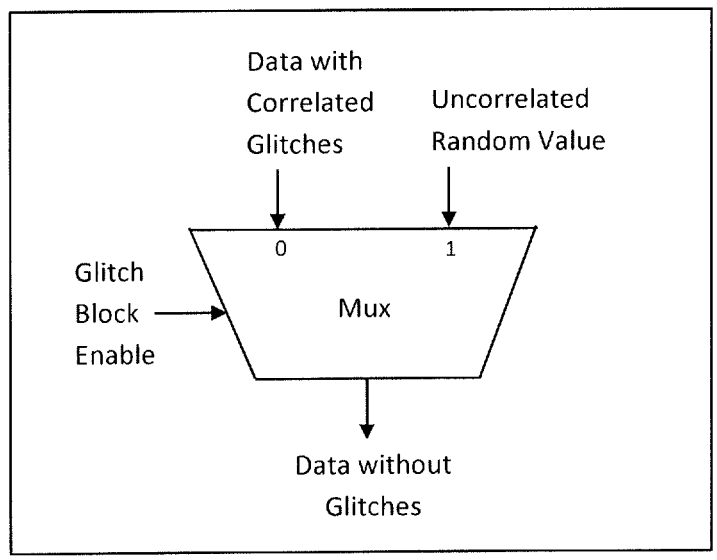
FIG. 1A is an exemplary apparatus of a glitch blocker using a MUX in accordance with an embodiment of the present invention.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures.

Additionally, the inclusion of a structural or method feature in a particular figure is not meant to imply that such feature is required in all embodiments and, in some embodiments, may not be included or may be combined with other features.

An exemplary logical computing system may be used in accordance with herein described systems and methods. Logical computing systems are capable of executing logic on or in relation to received instructions or data, such as using hardware and/or software. The logic may be supplied, by way of non-limiting example, in the form of logic gates, electronic components, and/or the like, or in the form of a computer readable storage medium suitable to store programming indicative of the logic, such as may be executed by a processor.

The present invention provides methods, systems and apparatuses to block and replace intermediate combinatorial transitions that are correlated with secret data with random intermediate combinatorial transitions that are uncorrelated with the data being processed. In this way, the intermediate combinatorial transition will reveal random information, rather than information which can be correlated with the secret information being processed.

More particularly, when a circuit has multiple levels of combinatorial logic, input transitions may cause intermittent transitions, or transients, on intermediate logic and output logic due to logic delays and path propagation. These transients are also known as combinatorial logic "glitches."

In a synchronous circuit the glitches do not change the functionality of the circuit, yet their measurement can reveal information about the current and previous states of logic, thereby representing a side-channel leak. Accordingly, even in a circuit that masks the input and the outputs, these glitches may reveal information.

If glitches correlated with data are blocked from propagating further in combinatorial logic, then the amount of leaked information is reduced. In addition, if random, uncorrelated glitches unrelated to a circuit's inputs are substituted at input transition times, the amount of information related to the data being processed is reduced.

In accordance with certain of the exemplary embodiments, a glitch can be blocked from continued propagation using a multiplexer (MUX) with one input from a functional combinatorial logic signal that has data-correlated glitches and another input being an uncorrelated signal with a select which enables glitch blocking. The uncorrelated signal may be fixed logic, such as all zeros; predictable logic, such as a counter; or unpredictable logic, such as data from a random number generator. The glitch blocker enable may select the uncorrelated signal until some or all of the data correlated combinatorial logic gates have reached steady state with stable inputs, and therefore when no further data-correlated glitching occurs.

Figure 1B:
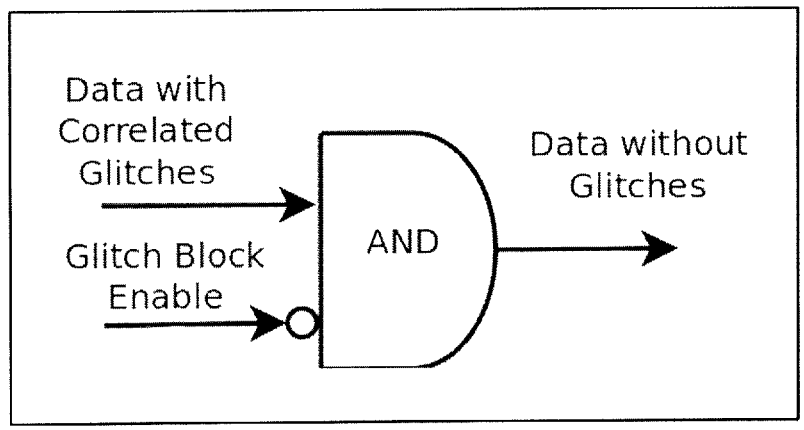
FIG. 1B is an exemplary apparatus of glitch blocker using an AND gate in accordance with one embodiment of the present invention.

With reference now to FIG. 1A, illustrated is an exemplary apparatus of a glitch blocker using a MUX. Alternatively, the exemplary glitch blocker may be implemented using any equivalent logic, such as using an AND gate, as shown in FIG. 1B, with the input signal having data-correlated transients, the glitch blocker enable as the input to the AND gate and the uncorrelated signal effectively equal to zero.

The glitch blocker enable can be generated in multiple ways. One exemplary method for generating a glitch block enable is to use Steady to Unpredictable (StU) logic. StU logic consists of, but is not limited to, any cloud logic with input and output that transitions between a steady known state and an unpredictable state. When the StU logic is in a steady state, the input and output may be at known logic values. The StU logic is then transitioned from the steady state to an unpredictable state that has a different output than the steady state. An example of StU logic is a multiplier with steady state inputs set to zero and unpredictable state inputs set to non-zero random values.

When the StU logic is in a steady state at the start of a clock cycle, the glitch block enable may be asserted. When the output of the StU logic changes to the unpredictable output, the glitch block enable is negated. Alternatively and additionally, StU logic may be configured such that the glitch block enable is asserted in an unpredictable state, and is negated when the StU logic changes to the steady state output.

Figure 2:
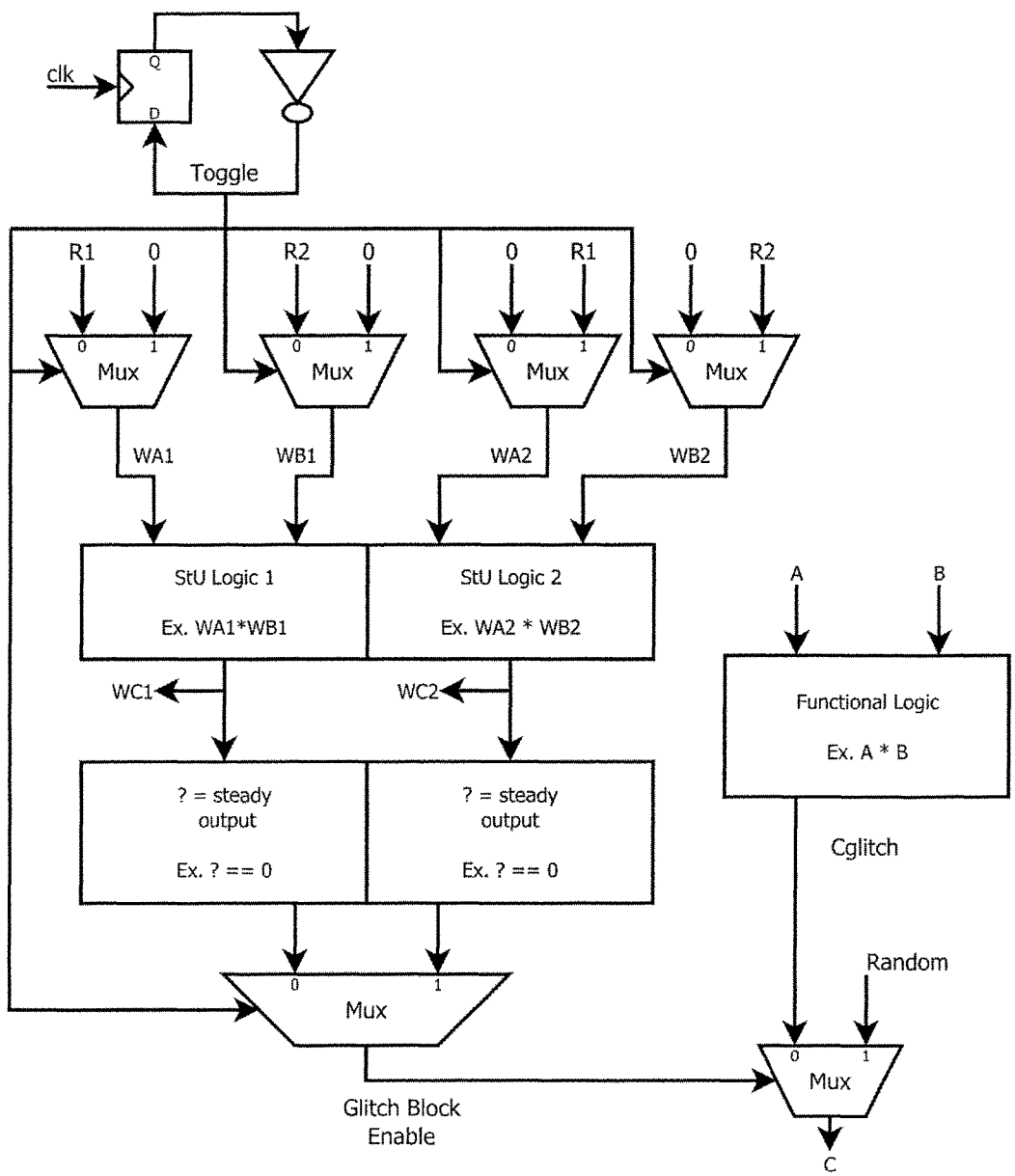
FIG. 2 is an exemplary apparatus of two sets of multiplier based StU logic in accordance with an embodiment of the present invention.
Figure 3:
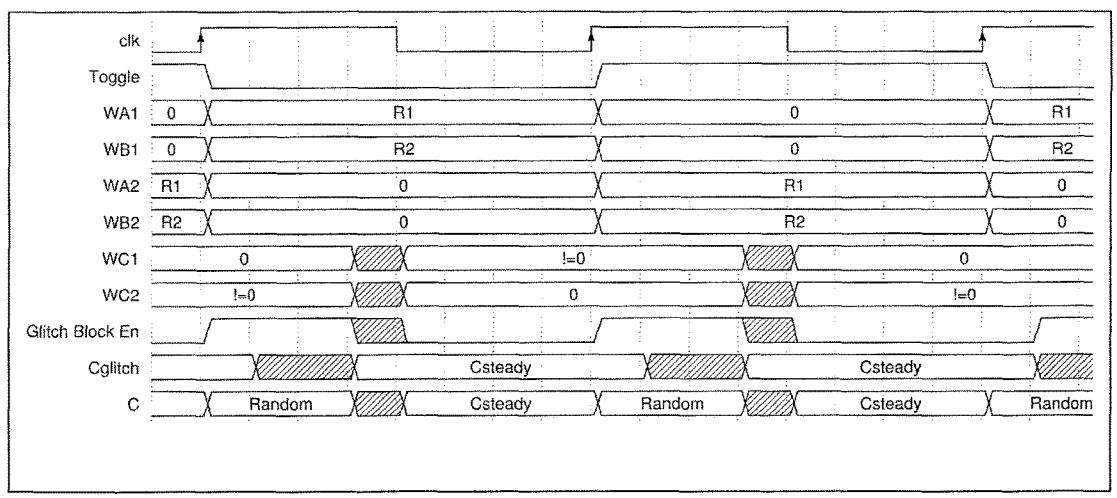
FIG. 3 is a simplified example timing diagram in accordance with an embodiment of the present invention.

Two sets of StU logic may be used together to provide glitch blocking on every clock cycle by switching back and forth between the glitch block enable output of each set. FIG. 2 illustrates one exemplary embodiment of the invention in which two sets of multiplier-based StU logic are used to generate a glitch enable. FIG. 3 provides a timing diagram associated with the operation of the exemplary embodiment of FIG. 2.

In the example of FIGS. 2 and 3, the StU logic is a multiplier to block glitches from the functional logic multiplier. The inputs to the StU multipliers toggle between zeros (steady state) and R1/R2 (non-zero unpredictable values). When the toggle select is 0, StU Logic 1 is selected and the output WC1 transitions from 0 to non-zero during the clock cycle. When the toggle select is 1, StU Logic 1 is selected and the output WC2 transitions from 0 to non-zero during the clock cycle. A MUX selects which StU logic steady state output comparator to use as the Glitch Block Enable during a clock cycle based on the toggle select. The result is a Glitch Block Enable that starts each clock cycle at 1 and transitions to 0 during the clock cycle. By using StU logic that is similar to the functional logic, the delay for the glitch block enable to be negated is very close to the delay for the functional logic to reach a steady state without glitches. Therefore, it is unnecessary to determine the settling time of the functional combinatorial logic signal when using the StU logic glitch block enable generation methodology. Additionally, by using unpredictable state inputs, the delay time for the glitch block enable to be negated is variable which adds intra-clock variability to logic transition associated with the glitch blocker.

StU logic can be chained together where the output of a StU logic block is the input of another StU logic block. This allows for multiple glitch block enables to be used for different levels of combinatorial logic in a design. By using chained StU blocks, glitches associated with multiple levels of logic in the functional combinatorial design are blocked, which decreases the information leakage associated with each selected logic level, and therefore, with the overall design.

Figure 4:
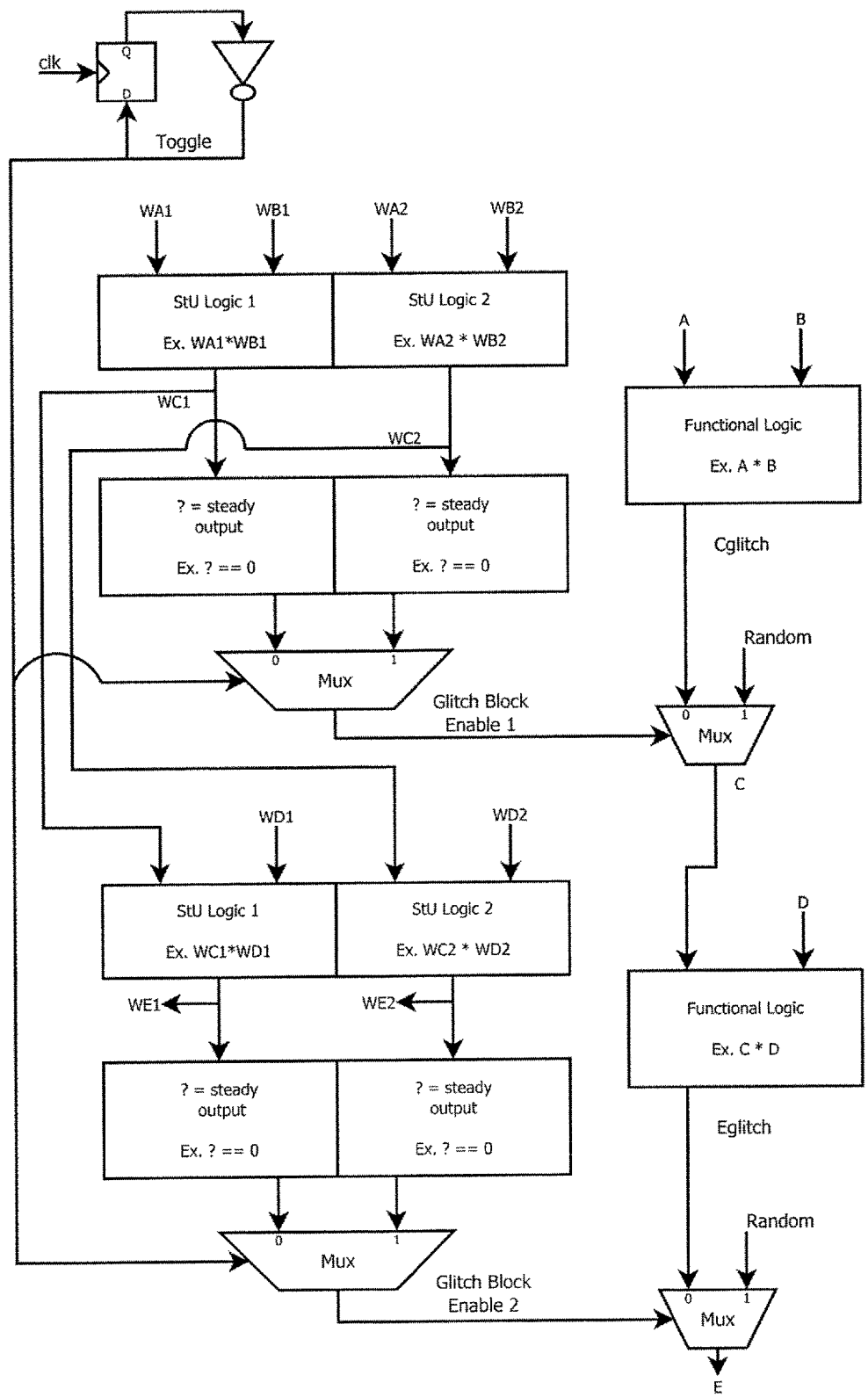
FIG. 4 is an exemplary apparatus of chained StU logic in accordance with an embodiment of the present invention.
Figure 5:
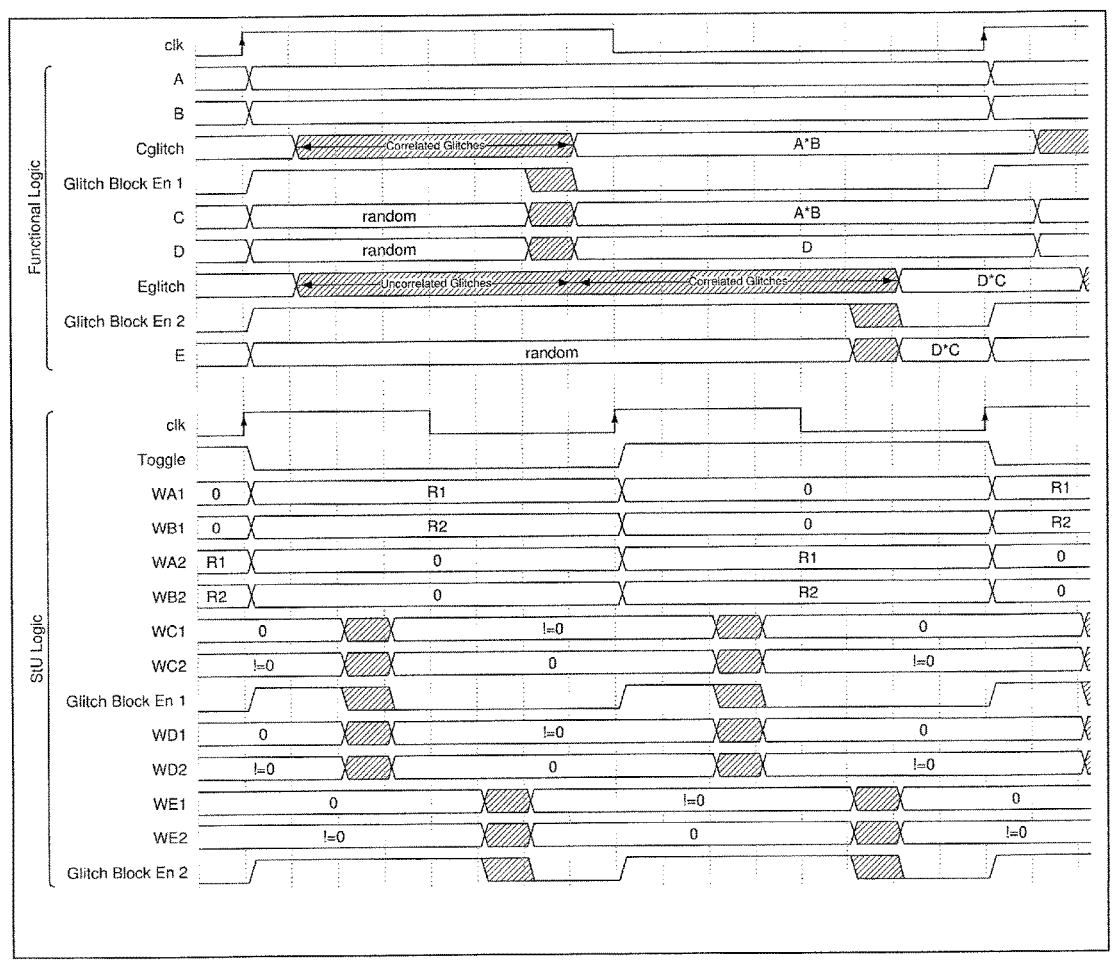
FIG. 5 is a simplified example timing diagram in accordance with an embodiment of the present invention.

FIG. 4 illustrates an exemplary apparatus of chained StU logic, and FIG. 5 provides a timing diagram associated with the exemplary embodiment of FIG. 4. In this example, the first level StU logic output, WC1 and WC2, is the input to the second level StU logic input. The other second level input, WD1 and WD2, are the StU input associated with the functional signal D. As shown in the timing diagram, the Cglitch signal has glitches correlated with the data being processed. After the glitch blocker, the signal C has replaced the glitches in Cglitches with a random value without glitches. On the second level, the Eglitch signal contains both correlated and uncorrelated glitches. This is due to its input being initially random and then transitioning to the steady state intermediate results. After the second level glitch blocker, the uncorrelated and correlated glitches in signal E may be replaced by a random value without glitches.

In another method for generating a glitch block enable using logic with fixed inputs and outputs, the set of logic is set an initial state at the beginning of a clock cycle and then transitioned to a different fixed value. When the transition propagates to the new known output the glitch block enable is negated. This method can be achieved using area efficient delay buffers.

Figure 6:
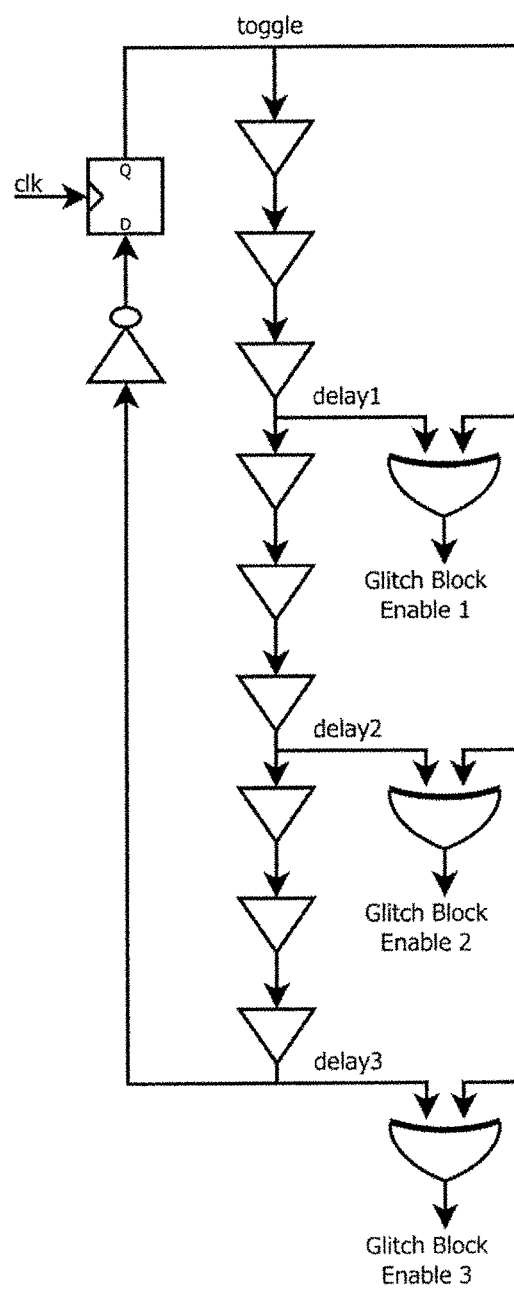
FIG. 6 is an exemplary apparatus of using fixed input and output with delay buffers in accordance with an embodiment of the present invention.
Figure 7:
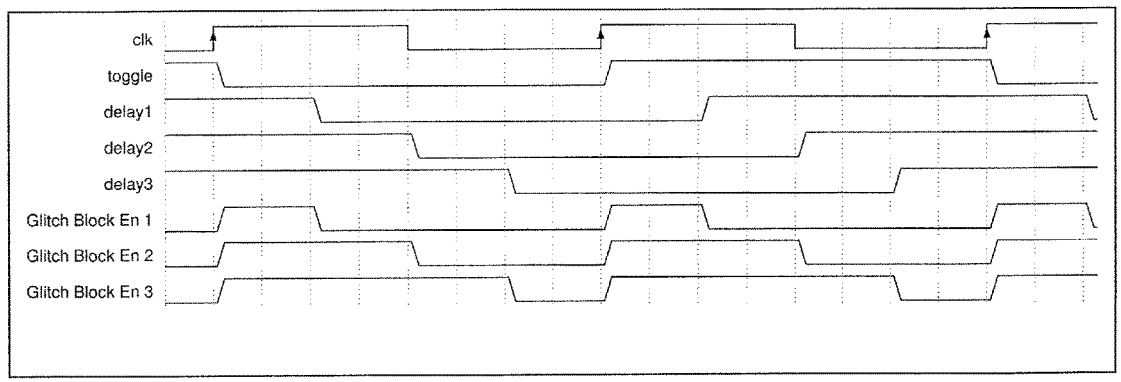
FIG. 7 is a simplified example timing diagram in accordance with an embodiment of the present invention.

FIG. 6 illustrates an exemplary apparatus of using fixed input and output with delay buffers to generate multiple glitch block enable signals, and FIG. 7 provides a timing diagram associated with the exemplary embodiment of FIG. 6. In this example, a chain of delay buffers are used with a toggle register to generate three glitch block enable signals. The delay signals are tapped from different locations within the delay buffer chain and XORed with the toggle register output to generate each glitch block enable signals.

In yet another method for generating a glitch block enable, this one using phase delayed register XORing, one or more clocks with phase delays (as compared to the main clock) are generated. The main clock and the phase delay clock each clock a toggle register. The toggle phase delayed toggle register is XORed with the main toggle register to generate the glitch block enable.

Figure 8:
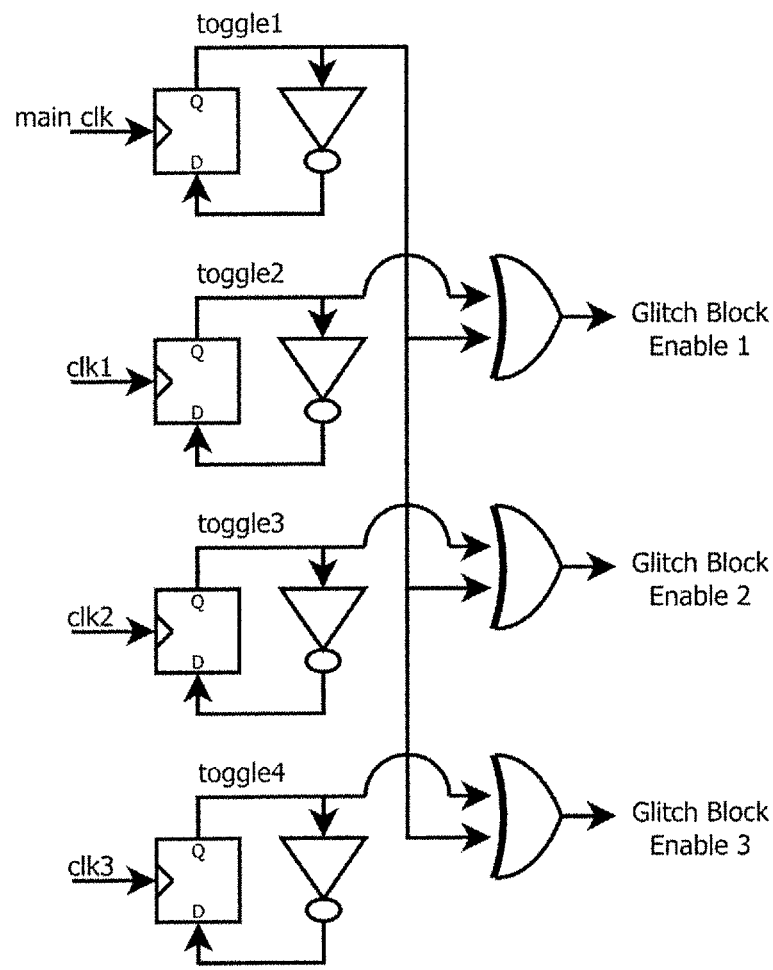
FIG. 8 is an exemplary apparatus of using phase-delayed register XORing in accordance with an embodiment of the present invention.
Figure 9:
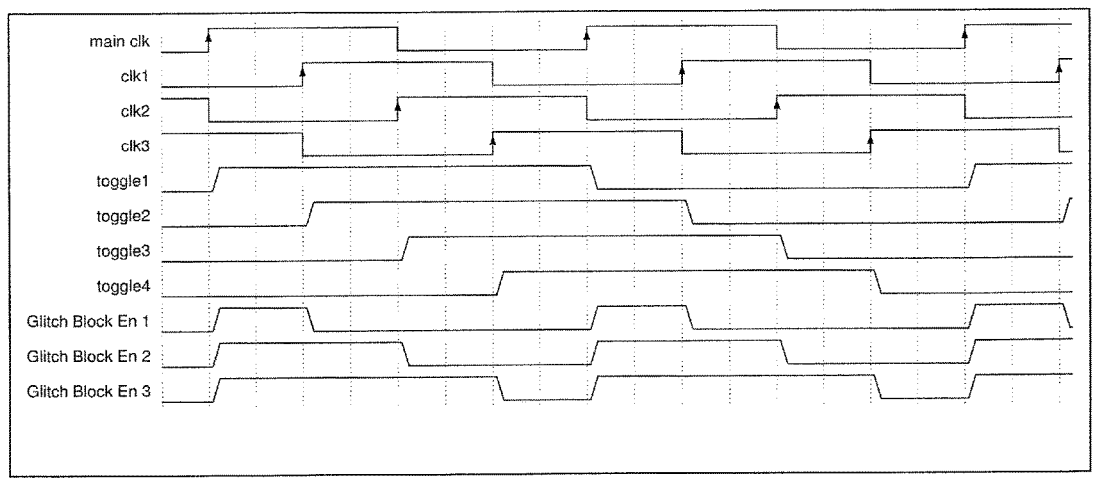
FIG. 9 is a simplified example timing diagram in accordance with an embodiment of the present invention.

FIG. 8 illustrates an exemplary apparatus of using phase delayed register XORing to generate multiple glitch block enable signals, and FIG. 9 provides an associated timing diagram. In this example, three phase shifted clocks at the same frequency as the main clock are used to generate three glitch block enable signals. The main clock and the three phased shifted clocks are used by four toggle registers. The glitch block enable signals are generated by XORing the phase shifted toggle registers with the main clock toggle register.

And in still another method for generating a glitch block enable, using high speed clock registers, a clock with an integer multiple frequency to the main clock is used. This high speed clock is used control a register set that creates multiple glitch blocker enable signals with timing offsets equal for each of the fractions of the clock multiplier.

Figure 10:
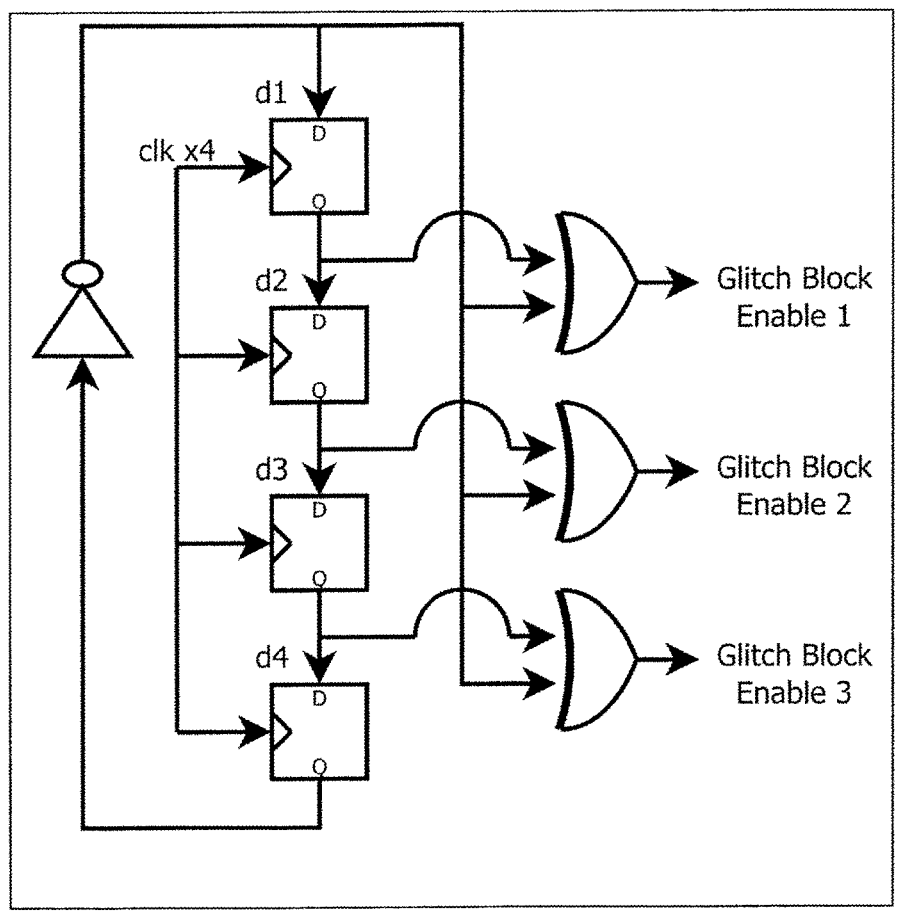
FIG. 10 is an exemplary apparatus of using high speed clock registers in accordance with an embodiment of the present invention.
Figure 11:
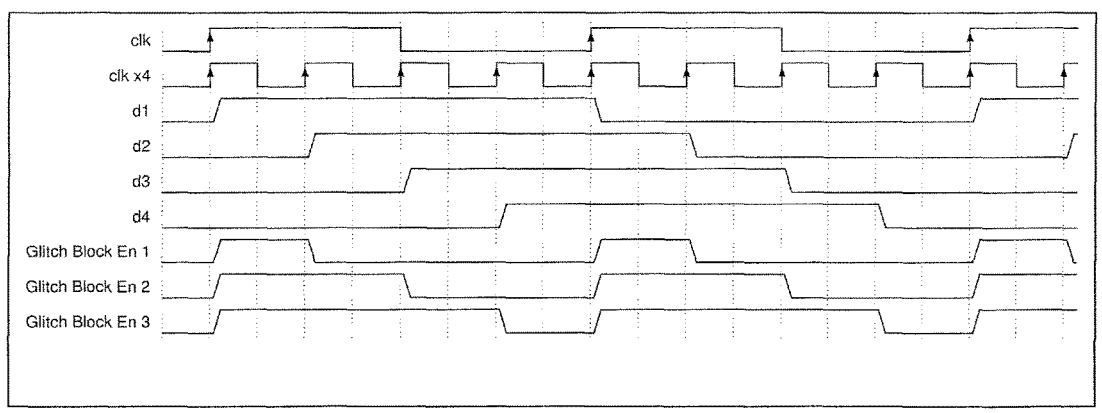
FIG. 11 is a simplified example timing diagram in accordance with an embodiment of the present invention.

FIG. 10 illustrates an exemplary apparatus of using high speed clock registers XORing to generate multiple glitch block enable signals, and FIG. 11 provides an associated timing diagram. In this example, a four times faster clock than the main clock with no phase delay is used to generate three glitch block enable signals. Four shift registers are used where the input to the first shift register is the inverse of the last shift register output. The glitch block enables are generated by XORing the first shift register's input with the remaining shift registers' inputs.

One-shot glitch generators may be used to add random transient glitches into combinatorial logic which are uncorrelated to the data being processed. The one-shot glitch generator consists of multiple multiplexers connected in series using the same select. The multiplexers consist of one uncorrelated input and one glitch input and a one-shot select signal. The one-shot select signal can be any signal that selects the unpredictable input when one-shot glitches are beneficial to be added into a functional combinatorial design. The glitch blocker enable signal previously described can be used as such a signal. When a glitch blocker enable signal is used with a one-shot glitch generator and a glitch blocker, data correlated glitches are replaced with random uncorrelated glitches.

The uncorrelated input can be any signal that is uncorrelated to the data being processed, such as a fixed or random value. The glitch input should be unpredictable data combined with the output of the previous multiplexer in series. If it is the first multiplexer, the glitch input can just be unpredictable data. The combining function can be any function that will allow the unpredictable data entropy to propagate through the series multiplexers. Often, an XOR is the best suited combining function. Additionally any data that needs to be combined with the functional output may be combined with the glitch input at any stage in the series of multiplexers. The output of the last multiplexer is combined with the functional output. The output of the one-shot glitch can either create no functional difference by creating a total combined signal difference of zero or by having the combined signal be performed on mask system where the combined difference of the output of each glitch generator for the masks is zero.

Figure 12:
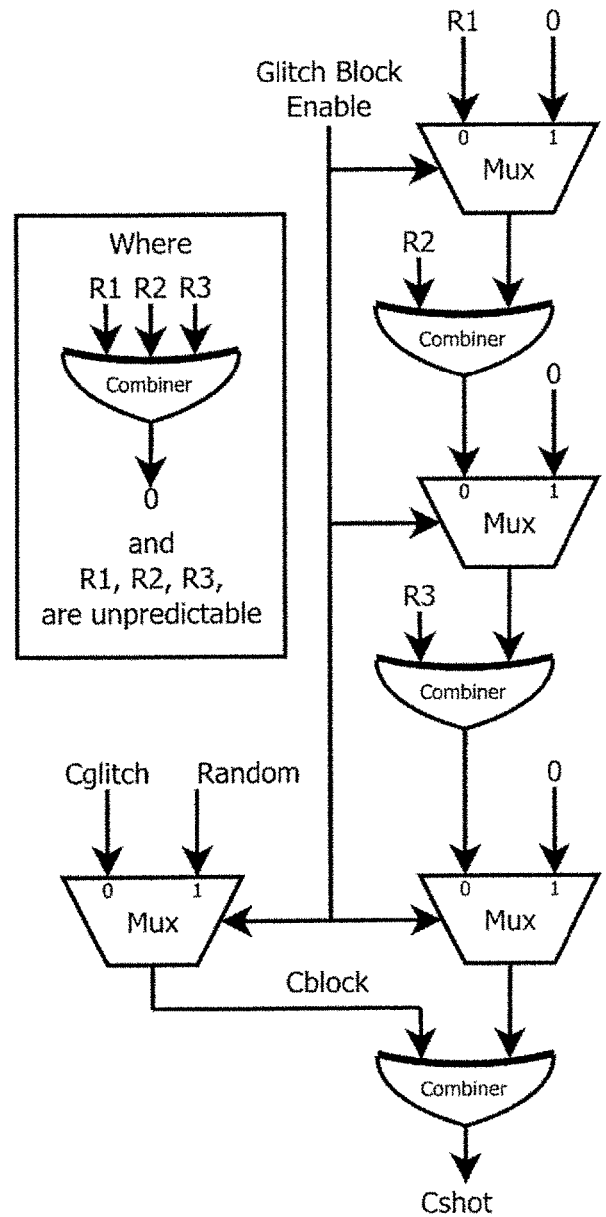
FIG. 12 is an exemplary apparatus of a one-shot glitch generator in accordance with an embodiment of the present invention.
Figure 13:
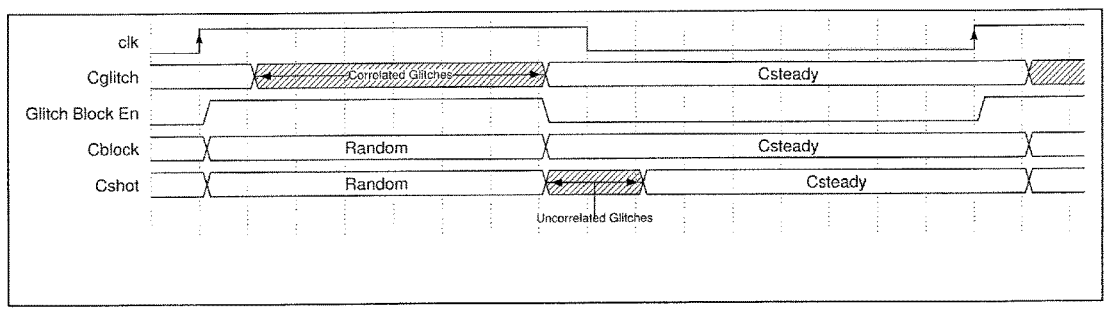
FIG. 13 is a simplified example timing diagram in accordance with an embodiment of the present invention.

FIG. 12 illustrates an exemplary apparatus of a one-shot glitch generator using a series of three multiplexers connected to a glitch blocker, and FIG. 13 provides an associated timing diagram. In this example, the uncorrelated data inputs to each MUX are set to 0, the glitch inputs to each MUX are R1, R2, and R3, and the combiner function is an XOR. This one shot glitch generator is connected to a glitch blocker where Cglitch is the functional data with correlated glitches, Cblock is the functional data without glitches, and Cshot is the functional data with the one-shot uncorrelated glitches added. The Csteady value in the timing diagram is the steady state functional result. In this example C is not part of a mask share so the result of XOR combining R1, R2, and R3 should be zero. However if it were part of a mask share the one-shot glitch generator associated with another share could be set to the same R1, R2, and R3 values without requiring the result of XOR combining R1, R2, and R3 to be zero.

The one-shot glitch generator may consist of multiplexers or equivalent in series. The multiplexers may use the same select which selects the unpredictable input. One-shot glitches may be beneficial to reduce the signal-to-noise (SNR) ratio of the information leakage. The inputs may consist of an uncorrelated signal, which can be any signal that is uncorrelated to the data being processed, such as a fixed or random value variable, and an unpredictable random value input signal which is combined with the output of the previous multiplexer in series unless it is the first multiplexer. The output of the last multiplexer may be combined with the functional output and the combining causes no functional difference by creating a total combined signal difference of zero.

A one-shot glitch generator may be used for all or some of individual functional masked signals, so that the combined difference across all the one-shot glitch generators on the masks is zero. Similarly, rather than using differencing as the combining function, XOR or addition may be used as the combining function. Finally, a one-shot glitch generator may be used in combination with a glitch blocker in additional exemplary embodiments.

In sum and in accordance with the foregoing, provided herein are descriptions of exemplary glitch blocker circuits that may be used for the purpose of reducing information leakage due to combinatorial logic glitches. The glitch blocker may consist of a MUX or its equivalent, with an input signal that has glitches to be blocked, an uncorrelated signal that can be fixed or variable, and a glitch block enable signal.

In the exemplary embodiments, these glitch blocker circuits may be provided using a circuit to generate the glitch block enable signal using: StU logic for generating a glitch block enable; two or more sets of StU logic to provide a glitch block enable on every clock cycle that indicates the transition from unpredictable to steady or vice versa; a circuit using fixed logic delay for generating a glitch block enable; a circuit using phase delayed register XORing; or a circuit using high speed clock registers for generating a glitch block enable.

Those of skill in the art will appreciate that the herein described systems and methods may be subject to various modifications and alternative constructions. There is no intention to limit the scope of the invention to the specific constructions described herein. Rather, the herein described systems and methods are intended to cover all modifications, alternative constructions, and equivalents falling within the scope and spirit of the invention and its equivalents.

The invention claimed is:

1. A glitch block circuit for reducing information leakage due to combinatorial logic glitches, the glitch block circuit comprising:
   combinatorial logic,
   wherein the combinatorial logic outputs a first signal having one or more combinatorial logic glitches,
   wherein combinatorial logic glitches of the one or more combinatorial logic glitches are correlated to cryptographic data being processed via the combinatorial logic;
   logic,
   wherein the logic is configured to receive:
      the first signal;
      a glitch block enable signal,
      wherein the logic is configured to output an output signal, such that the output signal is either:
         the first signal; or
         a second signal,
      depending on a value of the glitch block enable signal,
      wherein the second signal is uncorrelated to the cryptographic data being processed.

2. The circuit according to claim 1, further comprising:
   steady to unpredictable logic,
   wherein the glitch block enable signal is generated via the steady to unpredictable logic.

3. The circuit according to claim 2, further comprising:
   wherein the steady to unpredictable logic comprises:
      a first set of steady to unpredictable logic; and
      a second set of steady to unpredictable logic,
   wherein the first set of steady to unpredictable logic outputs a first set glitch block enable signal,
   wherein the second set of steady to unpredictable logic outputs a second set glitch block enable signal,
   wherein the glitch block enable signal is toggled between the first set glitch block enable signal and the second set glitch block enable signal such that combinatorial logic glitches of the one or more combinatorial logic glitches are blocked on every clock cycle of a clock signal with respect to which the cryptographic data being processed is processed.

4. The circuit according to claim 2,
   wherein the steady to unpredictable logic comprises:
      a first steady to unpredictable logic block; and
      a second steady to unpredictable logic block,
   wherein the first steady to unpredictable logic block receives first steady to unpredictable logic block inputs and outputs first steady to unpredictable logic block outputs,
   wherein the second steady to unpredictable logic block receives second steady to unpredictable logic block inputs and outputs second steady to unpredictable logic block outputs, and
   wherein the first steady to unpredictable logic block outputs are the second steady to unpredictable logic block inputs.

5. The circuit according to claim 1, further comprising:
   a glitch block enable signal generator,
   wherein the glitch block enable signal generator generates the glitch block enable signal, and
   wherein the glitch block enable signal generator comprises one or more delay buffers.

6. The circuit according to claim 1, further comprising:
   a glitch block enable signal generator,
   wherein the glitch block enable signal generator generates the glitch block enable signal, and
   wherein the glitch block enable signal-generator comprises:
      a first toggle resister having a main clock signal with respect to which the cryptographic data being processed is processed as a first toggle register input; and
      one or more additional toggle registers having a corresponding one or more additional clock signals as a corresponding one or more additional toggle register inputs,
   wherein the one or more additional clock signals have a corresponding one or more phase delays with respect to the main clock signal.

7. The circuit according to claim 1, further comprising:
   a glitch block enable signal generator,
   wherein the glitch block enable signal generator generates the glitch block enable signal, and
   wherein the glitch block enable signal generator comprises one or more high speed clock shift registers.

8. The circuit according to claim 1,
   wherein the logic comprises a multiplexer.

9. The circuit according to claim 1,
   wherein the logic comprises an AND gate.

10. A glitch block circuit for reducing information leakage due to combinatorial logic glitches, comprising:
    logic with an input signal that has one or more combinatorial logic glitches,
    wherein combinatorial logic glitches of the one or more combinatorial logic glitches are correlated to cryptographic data being processed; and
    a glitch block enable signal; and
    a one-shot glitch generator consisting of at least two multiplexers in series,
    wherein the at least two multiplexers in series are n multiplexers in series, where n is an integer;
    a corresponding n combiners, wherein a first multiplexer of the n multiplexers is configured to receive:
       a first glitch input signal of a corresponding n glitch input signals,
       wherein the n glitch input signals are a corresponding n unpredictable random value input signals;
       a first uncorrelated signal of a corresponding n uncorrelated signals,
       wherein the n uncorrelated signals are uncorrelated to cryptographic data being processed; and
       a one-shot select signal,
    wherein the first multiplexer of the n multiplexers is configured to output a first multiplexer output,
    wherein a first combiner of the n combiners is configured to receive:

the first multiplexer output; and
the second glitch input signal of the n glitch input signals, and
wherein the first combiner of the n combiners is configured to output a first combiner output,
wherein an $m^{th}$ multiplexer of the n multiplexers, where $1<m<n$, is configured to receive:
an $m^{th}$ uncorrelated signal of the n uncorrelated signals,
an $(m-1)^{th}$ combiner output; and
the one-shot select signal,
wherein the an $m^{th}$ multiplexer of the n multiplexers is configured to output an $m^{th}$ multiplexer output,
wherein an $(n-1)^{th}$ combiner of the n combiners is configured to receive:
an $(n-1)^{th}$ multiplexer output; and
an $n^{th}$ glitch input signal of the n glitch input signals; and
wherein the $(n-1)^{th}$ combiner of the n combiners is configured to output an $(n-1)^{th}$ combiner output,
wherein an $n^{th}$ multiplexer of the n multiplexers is configured to receive:
an $n^{th}$ uncorrelated signal of the n uncorrelated signals,
the $(n-1)^{th}$ combiner output; and
the one-shot select signal,
wherein the $n^{th}$ multiplexer of the n multiplexers is configured to output an $n^{th}$ multiplexer output,
wherein an $n^{th}$ combiner of the n combiners is configured to receive:
the $n^{th}$ multiplexer output; and
a functional output,
wherein the $n^{th}$ combiner of the n combiners is configured to output an $n^{th}$ combiner output,
wherein the one-shot select signal selects the first glitch input signal of the n glitch input signals, the $(m-1)^{th}$ combiner output when $1<m<n$, and the $(n-1)^{th}$ combiner output, when one-shot glitches are beneficial to reduce a signal-to-noise ratio of an information leakage,
wherein the cryptographic data being processed is a fixed or random value variable, and
wherein the $n^{th}$ multiplexer output is combined with the functional output to produce the $n^{th}$ combiner output, and
wherein combining the $n^{th}$ multiplexer output with the functional output causes no functional difference by creating a total combined signal difference of zero.

11. A method of blocking one or more combinatorial logic glitches in a signal, comprising:
receiving a first signal having one or more combinatorial logic glitches,
wherein combinatorial logic glitches of the one or more combinatorial logic glitches are correlated with cryptographic data being processed; and
outputting an output signal,
wherein a first portion of the output signal is the first signal,
wherein a second portion of the output signal is uncorrelated to the cryptographic data being processed during at least one duration of the input signal having a corresponding at least one combinatorial logic glitch of the one or more combinatorial logic glitches.

12. The method according to claim 11,
wherein the first input signal is received from combinatorial logic, and
wherein the combinatorial logic glitches of the one or more combinatorial logic glitches are correlated with cryptographic data being processed via the combinatorial logic.

13. The method according to claim 12, further comprising:
inputting the first input signal into logic;
inputting a glitch block enable signal into the logic; and
outputting the output signal from the logic,
wherein the output signal is either:
the first signal; or
a second signal,
depending on a value of the glitch block enable signal,
wherein the second signal is uncorrelated to the cryptographic data being processed.

14. The method according to claim 13,
wherein the logic comprises a multiplexer.

15. The method according to claim 13,
wherein the logic comprises an AND gate.

* * * * *